May 28, 1935.   F. R. JOHNSTON   2,002,578
WHEEL FREEING ATTACHMENT FOR AUTOMOBILE LIFTS
Filed Aug. 20, 1934
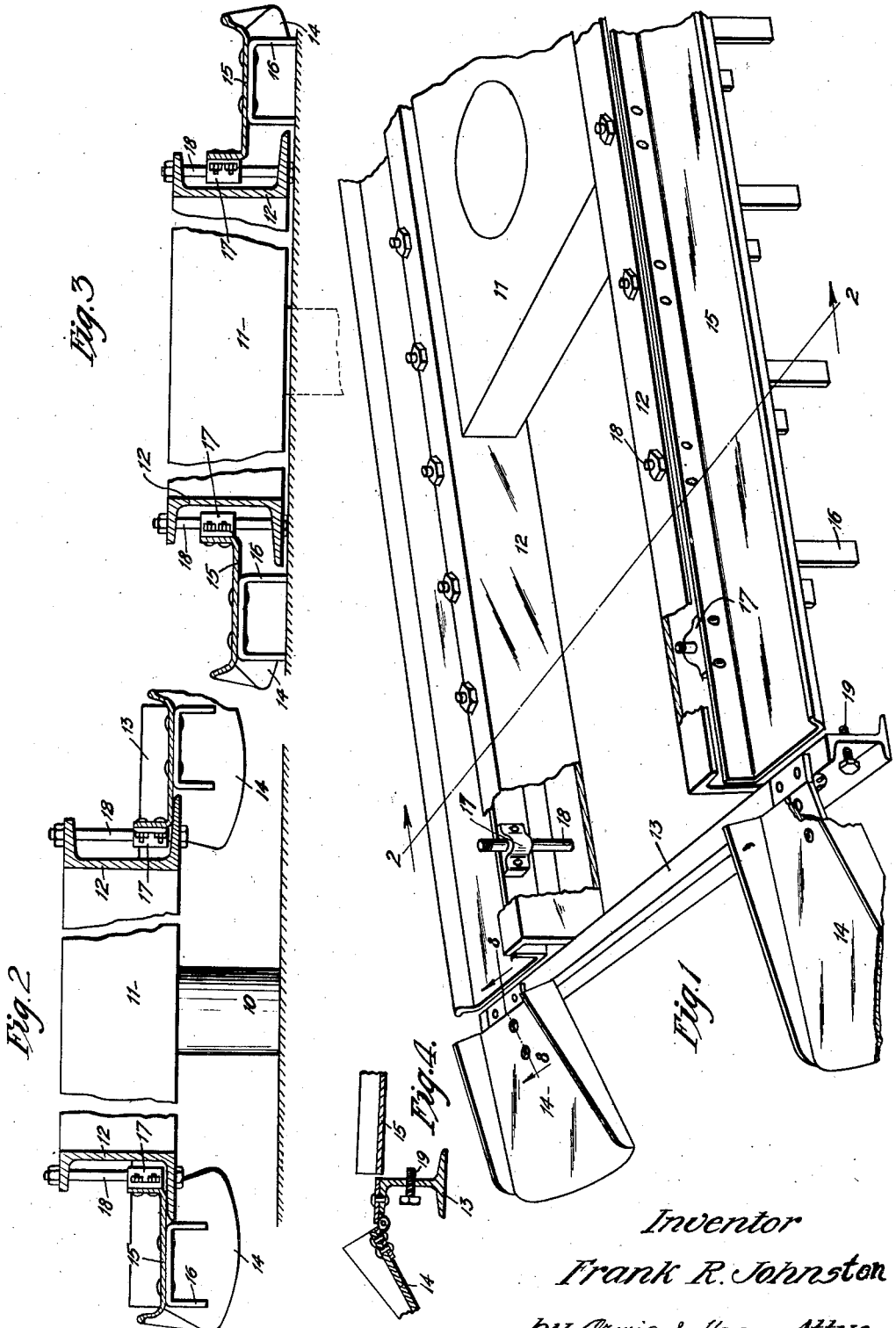
Inventor
Frank R. Johnston
by Orwig & Hague Attys.

Patented May 28, 1935

2,002,578

UNITED STATES PATENT OFFICE 2,002,578

WHEEL FREEING ATTACHMENT FOR AUTOMOBILE LIFTS

Frank R. Johnston, Des Moines, Iowa, assignor to Globe Machinery & Supply Company, Des Moines, Iowa, a corporation of Iowa Application August 20, 1934, Serial No. 740,598

6 Claims. (Cl. 254—89)

In the art of automobile lifts there are two classes of lifts now in common use. One is commonly known as the free wheel class, which comprises a frame over which an automobile may be driven, and then when the frame is elevated it engages the automobile axles and elevates the automobile to a position where it may be conveniently serviced, with the wheels free to be rotated or removed. The other class is commonly known as the roll on lift and is characterized by having trough shaped wheel supporting members with inclined ramps at the ends, and the automobile's wheels are driven upon this wheel supporting member and the lift and automobile are then elevated.

The free wheel variety of lifts is objectionable because of the danger of having an automobile slide laterally off of the lift when being serviced and, furthermore, when being serviced from underneath there is not enough room for an operator to have ready access to the under portion of the automobile near the longitudinal center thereof; and the roll on variety of lifts is objectionable in that the wheels cannot easily be removed and the brakes serviced.

My object is to provide a wheel freeing attachment for automobile lifts of simple, durable and inexpensive construction in which there is contained in a single lift all of the advantages and none of the disadvantages of both the roll on and wheel freeing types of lifts.

A further object is to provide a simple and inexpensive wheel stop device for preventing an automobile from running off the lift when the lift is in an elevated position, which stop device is automatically and forcefully moved to its elevated position for serving as a wheel stop when the lift is being elevated and which is also automatically and forcefully moved to its lowered position when the lift is moved downwardly into contact with a floor.

More specifically, it is my object to provide a device of this kind in which an automobile may be driven upon the lift with its wheels driven upon ramps to the wheel supporting troughs, so that the automobile is then accurately positioned relative to the lift, and then when the lift is elevated a few inches above the floor, the axles are engaged and the automobile held supported with the wheels spaced slightly above the wheel supporting troughs so that they may be serviced or removed in a convenient manner.

A further object is to provide a lift of this character in which the entire lift frame and its wheel supporting members are elevated from the floor so that the floor is left free and unobstructed for the convenience of the operator in servicing an automobile from the under side thereof.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a perspective view illustrating a portion of an automobile lift with my wheel freeing attachment applied thereto. In said view parts are broken away to illustrate details of construction.

Figure 2 shows a transverse sectional view on the line 2—2 of Figure 1, and illustrating a lift and wheel freeing attachment in a position slightly elevated above the floor surface.

Figure 3 shows a similar view illustrating position of a lift and wheel freeing attachment when in their lowered position to receive an automobile to be driven upon the wheel supporting troughs on the lift.

Figure 4 shows a detail sectional view on the line 8—8 of Figure 1.

Referring to the accompanying drawing, and particularly to the form illustrated in Figures 1, 2 and 3, I have used the reference numeral 10 to indicate an automobile lift plunger, to the upper end of which is attached a cross member 11, and to this cross member are attached two channel bars 12, with their flanges extended outwardly. At the end of the channel bars is a cross frame member 13 fixed to the channel bars. Ramps 14 of the kind commonly used in connection with roll on lifts are hinged to the cross member 13.

On each side of the lift I have provided a wheel supporting member 15 of the usual trough shape commonly employed in roll on lifts. Each of these wheel supporting members is provided with downwardly extended legs 16, and at the inner edge of the wheel supporting member 15 is a series of guide cleats 17 through which are extended bolts 18 which are fixed in upright position within the channel bars 12, and are slidingly mounted in the guide cleats 17.

The said cross frame member 13, as shown in Figures 1 and 4, has its upper surface flush with the wheel supporting trough 15 when the latter is in its elevated position with relation to the lift frame, hence, when the lift frame is elevated relative to the troughs 15 said frame members 13 will be elevated above the troughs 15 and serve as wheel stops to prevent an automobile from rolling off of the troughs 15.

When it is desired to use the lift as a roll on lift and not elevate the automobile wheels out of the troughs 15, then the operator may insert a bolt 19, or the like, in the cross member 13 to position for engaging the under surface of the trough 15 to thereby limit the upward movement of the lift frame relative to the trough 15 to such an extent as to prevent the lift from engaging the automobile axles, thus leaving the automobile wheels in the troughs 15. When this is done the cross members 13 continue to perform their function as automatic wheel stops in the manner before described, but do not project as far above the troughs as when the bolts 19 are removed and the lift operated as a free wheeling lift as before described.

In practical operation of this form of the invention, and when the lift is in its lowered position, as shown in Figures 1 and 3, an automobile is driven upon the lift over the ramps 14 and upon the wheel supporting members or troughs 15 in the same manner in which automobiles are now customarily driven on the roll on variety of lifts. When the lift is elevated the channel bars 12 and their slide bolts 18 move upwardly a short distance, while the wheel supporting members or troughs 15 remain stationary and rest upon the floor. When this upward movement of the lift has continued until about the position shown in Figure 2, then the channel bars 12 engage the automobile axles and elevate the automobile, and during this upward movement the automobile wheels are elevated above the wheel supporting members or troughs 15 so that the wheels may be serviced in the same manner as upon an ordinary free wheeling lift.

In view of the fact, however, that the automobile wheels roll on the wheel supporting members 15, the lift is always, automatically, properly centered relative to the automobile so that there is no danger of tilting the automobile when the lift is raised.

Furthermore, the parts are so shaped and arranged that if, after an automobile is raised on the lift and when being serviced, the automobile should start to tilt laterally relative to the lift, then the automobile wheels will engage in the trough shaped wheel supporting members 15 and prevent the automobile from tilting laterally off of the lift.

With my improved construction there is ample room for an operator to service the under surface of a car from between the channel bars 12 and the entire lift frame, as well as the wheel supporting members 15, are all elevated above the floor for the convenience of an operator in servicing an automobile from its under side. If necessary a block or jack, not shown, may be placed upon the top of the main frame 12 to engage an automobile chassis or axle.

My device has all the advantages of a free wheeling lift in connection with removing of wheels, brake testing and other similar services, with free and easy access to the under surface of the automobile when the lift is elevated, and with all of the safety features of the roll on variety of lifts.

I claim as my invention:

1. An automobile lift comprising a main frame, means for elevating it above a floor surface, wheel supporting members carried by the frame and capable of up and down movement relative to the frame, chassis engaging members carried by the main frame, means for holding the wheel supporting members spaced above a floor when the main frame is fully lowered, and means for limiting the up and down movement of the wheel supporting members relative to the main frame to such extent as will permit the main frame to be elevated to position with the chassis engaging members far enough above the wheel engaging members to elevate the automobile wheels above the wheel supporting members for wheel servicing purposes, but near enough to the wheels for the wheel engaging members to receive the wheels in the event that the chassis should slide laterally from the chassis engaging members, and then upon further elevation of the main frame to any desired position the said parts will maintain their said relative positions, and the frame and wheel supporting members will be elevated jointly above a floor.

2. An automobile lift comprising a main frame, means for elevating it above a floor surface, wheel supporting members carried by the frame and capable of up and down movement relative to the frame, chassis engaging members carried by the main frame, means for holding the wheel supporting members spaced above a floor when the main frame is fully lowered, and means for limiting the up and down movement of the wheel supporting member relative to the main frame to such extent as will permit the main frame to be elevated to position with the chassis engaging members far enough above the wheel engaging members to elevate the automobile wheels above the wheel supporting members for wheel servicing purposes, and then upon further elevation of the main frame to any desired position the said parts will maintain their said relative positions, and the frame and wheel supporting members will be elevated jointly above a floor.

3. An automobile lift comprising a main frame, means for elevating and lowering it, chassis engaging means on the frame for movement jointly with the main frame, wheel supporting members, and means for connecting the wheel supporting members with the main frame for movement in substantially fixed relation to each other during their movement from a short distance above the floor to their upper limit of movement, said connecting means permitting a downward movement of the frame after the wheel supporting members have reached their lower limit of movement, and also permitting a limited upward movement of the frame from its fully lowered position before elevating the wheel supporting members.

4. An automobile lift comprising a main frame, means for elevating and lowering it, chassis engaging means on the frame for movement jointly with the main frame, wheel supporting members, means for connecting the wheel supporting members with the main frame for movement in substantially fixed relation to each other during their movement from a short distance above the floor to their upper limit of movement, said connecting means permitting a downward movement of the frame after the wheel supporting members have reached their lower limit of movement, and also permitting a limited upward movement of the frame from its fully lowered position before elevating the wheel supporting members, and means for holding the wheel supporting members in an elevated position when the main frame is fully lowered.

5. In a lift of the class described, the combination of a main frame, means for elevating and lowering it, wheel supporting members carried by the main frame, means for permitting a limited up and down movement of the wheel supporting members relative to the main frame, and a wheel stop device carried by the main frame and extended across the wheel supporting members, said wheel stop device being so positioned on the main frame as to be substantially flush with the wheel supporting members when the latter are in an elevated position relative to the frame, and to move above the wheel supporting members as the main frame moves upwardly relative to the wheel supporting members.

6. In a lift of the class described, the combination of a main frame, means for elevating and lowering it, wheel supporting members carried by the main frame, means for permitting a limited up and down movement of the wheel supporting members relative to the main frame, and a wheel stop device fixed to the main frame and extended across the wheel supporting members, said wheel stop device being so positioned on the main frame as to be substantially flush with the wheel supporting members when the latter are in an elevated position relative to the frame, and to move above the wheel supporting members as the main frame moves upwardly relative to the wheel supporting members.

FRANK R. JOHNSTON.